Feb. 19, 1935.  E. R. VAUGHN  1,991,777
COMBINATION SPRING AND SHOCK ABSORBER
Filed July 31, 1934   2 Sheets-Sheet 1
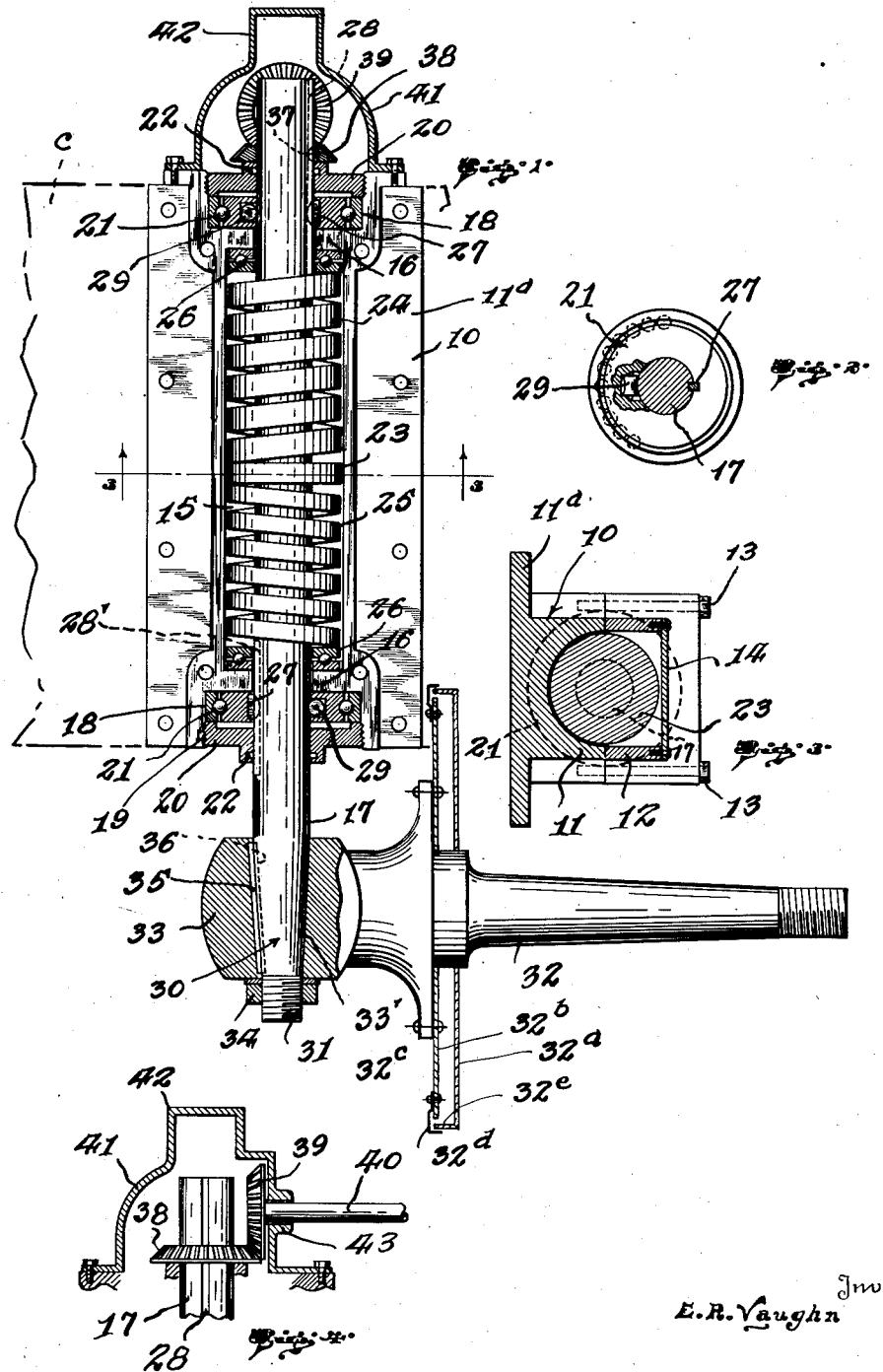
Inventor
E. R. Vaughn
By Christian T. Nielsen
Attorney

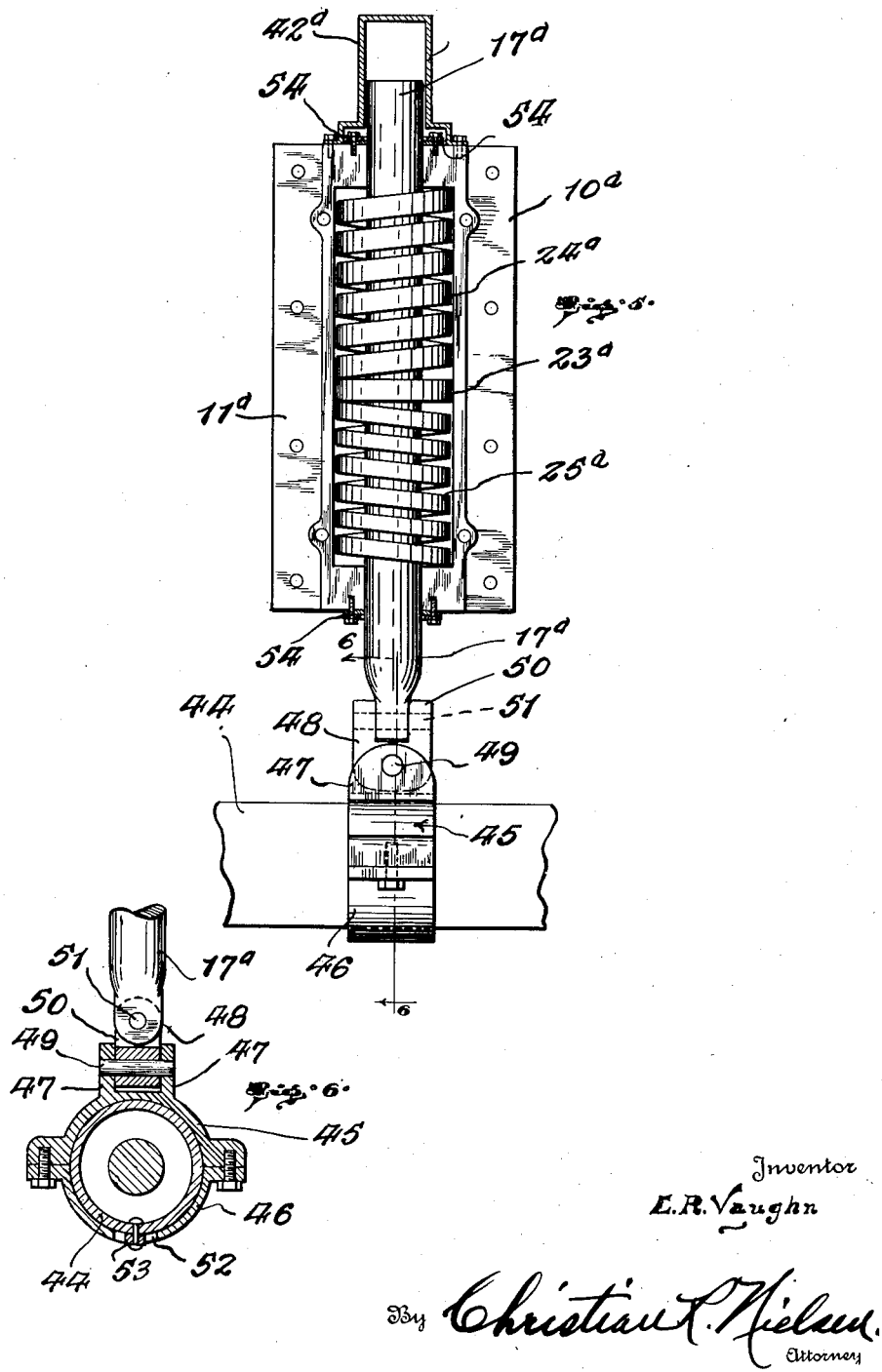

Patented Feb. 19, 1935

1,991,777

UNITED STATES PATENT OFFICE 1,991,777

COMBINATION SPRING AND SHOCK ABSORBER

Edwin R. Vaughn, Honesdale, Pa.

Application July 31, 1934, Serial No. 737,821

3 Claims. (Cl. 280—96.2)

This invention relates to a combination spring and shock absorber and it consists in the constructions, arrangements and combinations herein described and claimed.

It is a purpose of the invention to provide a resilient means for absorbing and dissipating shocks and jars to which a vehicle is subjected, without causing undue strain to the axles and wheels of the vehicle.

It is a further object of the invention to provide a resilient structure of such nature that the usual springs of a motor vehicle may be eliminated.

It is a still further object of the invention to provide a resilient supporting means which will permit individual movements of the vehicle axles, thereby allowing the wheels of a vehicle to partake of vertical movements without causing a similar movement to the vehicle chassis or frame, thereby providing, as is commonly known, in the automotive industry, as a "knee action".

Additional objects, advantages and features of invention will be apparent from the following description, considered in conjunction with the accompanying drawings forming a part of this application, wherein Figure 1 is a vertical sectional view through one of my shock absorbers, as applied to a front wheel spindle.

Figure 2 is a top plan view, partly in section, of an upper bearing.

Figure 3 is a cross section on the line 3—3 of Figure 1.

Figure 4 is a fragmentary detail illustrating the steering mechanism.

Figure 5 is a vertical sectional view of a shock absorber as applied to the rear axle of a motor vehicle.

Figure 6 is a cross section on the line 6—6 of Figure 5 illustrating the mode of attachment to the rear axle.

Attention is invited particularly to Figures 1 to 4, which disclose the invention as constructed and applied to the front wheel of a motor vehicle.

There is illustrated a casing 10 formed in two sections 11 and 12, bolted together by bolts 13. The section 11 includes a flange 11a suitably apertured for securement to a vehicle chassis C. The section 10 has a semi-circular interior, while the section 12 is illustrated as having a square interior which more readily permits the provision of an inspection plate 14.

It will be apparent that the sections 11 and 12 when bolted together define a longitudinal chamber 15, and each section 11 and 12 has an end partition wall 16. The partition walls 16 are centrally recessed so that a circular aperture is defined accommodating a vertically disposed shaft 17. Outwardly of the partition walls 16, the sections 11 and 12 are provided with an annular recess 18, the outer portion of which is threaded as at 19, within which a screw threaded cap 20 is engaged for securement of a ball race 21.

The cap members 20 slidably receive the shaft 17 therethrough and preferably include a recess 22 for receiving a compressed packing to prevent grease from being forced out of the spring chamber or foreign matter entering same.

The shaft 17 is of a length to extend beyond the ends of the casing 10, and has formed intermediate its length a circular collar 23, the collar occupying a position approximately midway of the chamber 15. Above the collar 23 there is provided a compression spring 24, and below the collar 23 a compression spring 25 is arranged, each of the springs having a seating engagement with a ball bearing assembly 26 disposed adjacent respective end wall partitions 16. The ball bearing assemblies will accommodate any rotary motion which may be set up by the springs, during their shock absorbing actions, thereby reducing friction to a minimum degree.

Inasmuch as the spring 24 functions to support the load of the vehicle these springs are considerably heavier in structure than the springs 25, the latter springs serving to check the rebound of the vehicle, all of which will be more clearly understood as the description proceeds.

The shaft 17 is longitudinally slidable through the bearing assemblies 21—26 and the cap members 22, and in order to insure true reciprocation of the shaft, each of the bearing assemblies 21 is provided with a key 27 which is slidably received within longitudinal slots 28—28' formed in the shaft. The assemblies 21 include a roller bearing 29, disposed upon the opposite side of the keys 27, these roller bearings further insuring true reciprocation of the shaft as well as maintaining the key and slot in alignment.

The lower end of the shaft 17 includes a tapered end 30, the extremity of which terminates in a threaded portion 31. Upon the tapered end 30, a stub axle 32 is fixed. The axle 32 may be secured to the shaft 17 in any approved manner, and in the present instance. I have shown tne axle 32 as including an enlargement 33 having a tapered bore 33' corresponding to the tapered end 30 of the shaft and receiving the tapered end therethrough, the threaded portion 31 extending beyond the enlargement 33, and receiving a washer and lock nut 34 thereon. A key 35 is positioned within the bore 33' and aligned with a key-way 36 of the shaft.

From the foregoing it will be apparent that upon rotation of the shaft 17 which is inherent upon steering of the vehicle, the stub axle will be swung accordingly, as will now be explained in detail, attention being invited particularly to Figures 1 and 4 of the drawings.

The slot 28 extends to the outer extremity of the shaft 17 and slidably received therein is a key 37 (see Fig. 1) of a bevel gear 38 which is in mesh with a similar gear 39 fixed to a shaft 40.

As has been indicated, the present construction is applied to the front or steering wheels of a vehicle, and obviously there will be a pair of assemblies identical in construction as shown in Figures 1 and 4, and the shaft 40 will therefore connect the assemblies, so that respective shafts 17 will be simultaneously moved to effect steerage of the vehicle. Any suitable form of connection between the shaft 40 and a steering wheel of a vehicle may be provided.

A housing 41 is secured to the casing 10 and includes an extended cap portion 42 permitting free reciprocation of the shaft 17, and also includes a journal 43 defining a bearing for the shaft 40.

It will be apparent from the foregoing that upon rotation of the shaft 40, motion will be imparted to the gears 39—38 with consequent rotation of the shaft 17, resulting in the desired movement of the stub axles and associated steering wheels.

The axle 32 also includes a brake drum housing 32a which may be of conventional construction, but in the present instance is shown as comprising an annular disk 32b suitably bolted to the axle hub as at 32c. The disk 32b stops inwardly of the drum slightly, and a flange 32d overlaps the flange 32e of the drum, thereby preventing entrance of dirt and water within the drum proper.

Reference is now made to Figures 5 and 6 wherein I have shown an adaptation of the shock absorber to the rear axle of a vehicle. The casing 10a is substantially the same as that previously described and shown and includes the mounting flange 11a for securing the structure to the chassis of a vehicle.

A shaft 17a is reciprocally mounted within the casing, and between respective ends thereof is a disk 23a against which compression springs 24a and 25a are positioned. Inasmuch as the shaft 17a projects beyond the casing 10a a cap 42a is bolted to the casing, preventing foreign matter entering the casing.

A rear axle housing 44 is shown, upon which there is seated a saddle 45 and this in cooperation with a saddle 46 provides a connection to the shaft 17a, as will now be described.

The saddle 45 includes a pair of spaced upstanding ears 47, between which a short link 48 is pivoted as at 49, the link 48 in turn having a pair of spaced ears 50, disposed in a plane at right angles to the ears 47, and between the ears 50, the lower end of the shaft 17a is pivotally mounted as at 51.

It will be readily seen that shocks transmitted to the axle will be readily absorbed by the compression spring 24a and the rebound will be checked by the spring 25a without transmission of shocks to the vehicle proper. It should also be noted that the pivotal connection between the shaft 17a and the axle housing 44 will permit movement of the axle either in a vertical or horizontal plane, or a combination of such movements, without setting up undue strain upon the shock absorber proper.

In order to insure proper retention of the saddles 45—46 the saddle 46 is slotted as at 52 and receives a lug 53 secured to the axle housing 44.

It is contemplated to pack the springs 24a in grease or other suitable lubricant and therefore at those points where the shaft 17a extends from the casing, packing plates 54 are fixed to the casing and snugly abut the shaft 17a, thereby preventing leakage of lubricant and foreign matter entering the same.

From the foregoing it will be apparent that a vehicle equipped with shock absorbers such as shown and described, the various wheels and axles of the vehicle will be permitted to move in vertical directions independently of each other, and any shocks or jars developed by such movements will not be transmitted to the vehicle chassis.

While I have shown and described a preferred embodiment of the invention, I do not confine myself thereto, and consider as my own, all such modifications as fairly fall within the scope of the appended claims.

I claim:—

1. In a vehicle body suspension, a housing having side and end walls defining a closed chamber, a shaft reciprocably mounted in the chamber and extending beyond the end walls thereof, ball bearing assemblies carried by the casing and supporting the shaft, guide means between the assemblies and the shaft, a collar integrally formed with the shaft and disposed within the chamber, compression springs within the chamber and interposed between respective end walls of the housing and the collar, means at one end of the shaft for rotating the same, and means at the opposite end of the shaft for securement to the axle of a vehicle.

2. In a vehicle body suspension, a housing having side and end walls defining a closed chamber, a shaft reciprocably mounted in the chamber and extending beyond the end walls thereof, ball bearing assemblies carried by the casing and supporting the shaft, guide means between the assemblies and the shaft, a collar integrally formed with the shaft and disposed within the chamber, compression springs within the chamber and interposed between respective end walls of the housing and the collar, a bevel gear supported by the housing and slidably receiving one end of the shaft, a bevel gear in mesh therewith, means for rotating the last named gear, and a stub axle keyed to the opposite end of the shaft.

3. In a vehicle body suspension, a housing, a shaft reciprocably mounted in the housing and extending beyond the ends thereof, guide means between the housing and shaft, a collar integrally formed with the shaft and disposed within the housing, compression springs within the housing and interposed between respective ends of the housing and the collar, means at one end of the shaft for rotating the same, and means at the opposite end of the shaft for securement to an axle of a vehicle.

EDWIN R. VAUGHN.